Sept. 11, 1945.  M. L. MOORE  2,384,689
VEHICLE SIGNAL
Filed April 19, 1943
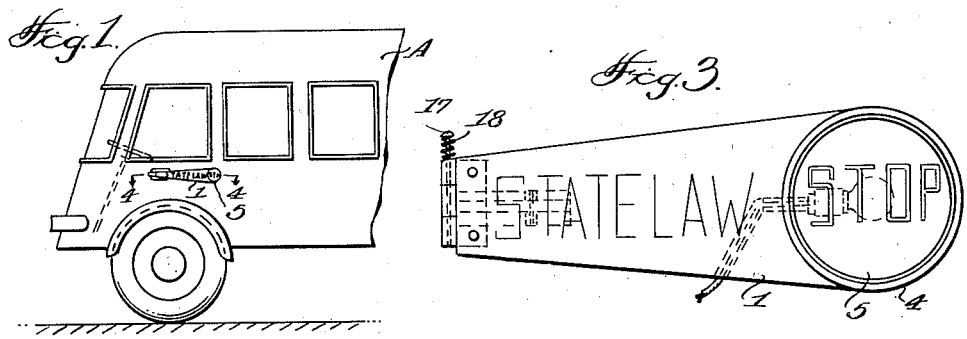
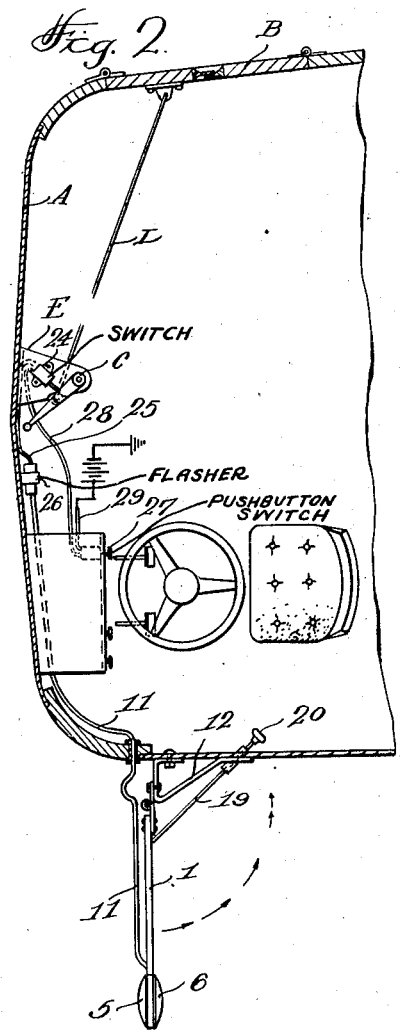
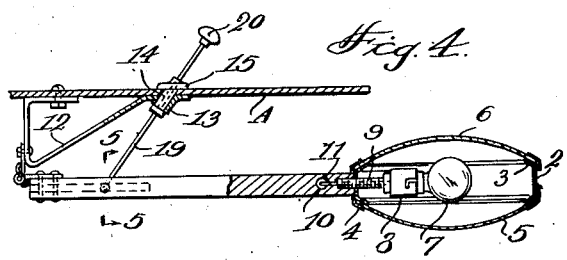
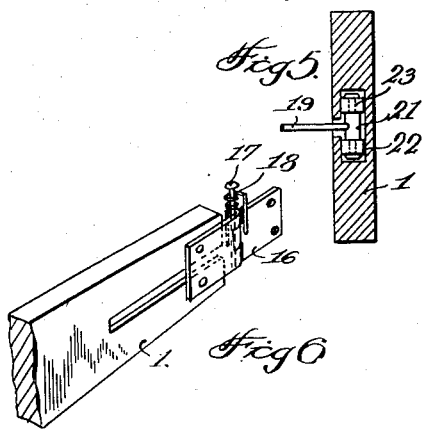
Murray L. Moore
INVENTOR
BY Victor J. Evans & Co.
ATTORNEYS Patented Sept. 11, 1945

2,384,689

UNITED STATES PATENT OFFICE 2,384,689

VEHICLE SIGNAL

Murray L. Moore, Cheyenne, Wyo.

Application April 19, 1943, Serial No. 483,629

3 Claims. (Cl. 177—329)

This invention relates to vehicle signals, and an important object thereof is to provide a signal device of the semaphore arm type, that is primarily designed for use on a public vehicle, such as an omnibus, to indicate to drivers of approaching vehicles that the signal equipped vehicle or bus is about to stop or has stopped to load and unload passengers, the arm being illuminated and the illuminating means is in circuit with a switch controlled by the door operating handle of the bus, in a manner so that the circuit is normally open, but is closed just prior to the time the door is moved to open position, thus my device tends to eliminate accidents, as well as brings about safety to passengers especially when leaving the bus.

A further object is to provide a vehicle signal device that includes a semaphore arm which is normally held parallel with a side of the vehicle and is movable at an outward angle thereto for disposal in signalling position, and the arm can be moved to its respective positions in an easy and expeditious manner.

Another object is to provide a vehicle signal device that is simple in construction, inexpensive to manufacture, easy to install in use and is extremely efficient in operation and service.

This invention also consists in certain other features of costructon and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a fragmentary side elevation illustrating one form of my device installed on a bus, and with the semaphore arm in normal position.

Figure 2 is a top plan view of the installed device in its entirety with the arm in signalling position and with parts shown diagrammatically.

Figure 3 is a front view of the arm in normal position.

Figure 4 is a sectional view taken approximately on line 4—4 of Figure 1.

Figure 5 is a sectional view taken approximately on line 5—5 of Figure 4.

Figure 6 is a fragmentary perspective view of the rear face of the arm and the spring hinge therefor.

Referring to the drawing in detail, and particularly to the form of Figures 1 to 6, the letter A indicates the body of the bus, B the door thereof and C the handle for operating the door to open and closed positions, through the medium of the usual operating means that includes a link D connected to the handle and door, as shown in Figure 2, which likewise discloses that the handle is pivotally connected to a bracket E that is fixed to the front of the bus body, and when the door is closed and the pivot of the link connecting the door to the handle is moved beyond dead center, the door is locked in closed position, or in other words is held against becoming casually opened.

The device of the form of Figures 1 to 6 includes a semaphore arm made up of a flat body 1 tapered outwardly toward its outer end, and the latter is recessed in substantially semicircular formation to provide a seat having secured therein a ring member 2 provided with inturned marginal flanges 3 on the opposite edges thereof. Secured against the flanges by removable rims 4 are lenses 5 and 6 which may be identical, but in any event are colored red and have the word "Stop" formed or otherwise provided thereon.

By that construction, it will be obvious that the ring member 2 and lenses 5 and 6 provide a lamp housing for a bulb 7 that is mounted in a socket 8, the latter being secured to a threaded nipple 9 which extends through the ring member and into the body 1 to be secured thereto by being threaded in the horizontal portion of a bore therein. The bore extends at an inward and downward angle from the longitudinal portion thereof and opens through the bottom of the body. Mounted in the angle portion of the bore is a sleeve 10 providing a conduit for a conductor 11 that is connected to the socket, as will be apparent.

In order to secure the semaphore arm to one side wall of the bus for swinging movement, I provide a substantially V-shaped bracket 12 having one leg shorter than the other, the short leg having its free end bent toward the free end of the long leg for disposal rearwardly of the latter, while the free end of the long leg is bent away from the bent portion of the short leg, but is disposed in alignment therewith. Each bent portion has an opening therein and the opening of the bent portion of the short leg receives the bolt of a bolt and nut connection for securing the same to the bus wall, as clearly shown in Figure 4. An outwardly extending collar 13 is formed about the opening of the bent portion of the long leg and removably secured within the collar is a sleeve 14 that extends through the bus wall at an inclined angle and has a flange 15 on the inner end thereof, that bears against the inner face of said wall to cooperate with the bolt and nut connection for securing the bracket 12 to said wall, with the short leg arranged at right angles to said wall and in advance of the long leg.

The semaphore arm is hinged to the short leg and for that purpose, I provide a leaf hinge 16 having one leaf thereof secured to the arm and the other leaf to the short leg adjacent the apex of the bracket. Sleeved on the pivot pin 17 of the hinge is a coil spring 18 that is formed with spring fingers engageable with the respective leaves for urging and holding the arm in normal position parallel with the bus wall, as best shown in Figure 4.

In order to move the arm to signalling position at right angles to said wall, as shown in Figure 2, I provide a handle that includes a rod like stem 19 which is slidably mounted in and through the sleeve 14 and the stem has a knob 20 on its inner end, while the outer end of the stem or rod has a collar 21 secured thereto, the collar being disposed within a guide chamber 22 extending along the longitudinal center of the arm which likewise has a slot therein that opens into the chamber. Journaled on a pin extending through the collar 21 is a pair of rollers mounted for travel in the chamber, with the result it will be seen that when the handle of the arm is pushed or moved outwardly, the arm is moved to signalling position and when the handle is pulled or moved inwardly, the arm is moved to normal position.

Secured to the bracket E is a spring pressed plunger type switch 24 having its plunger arranged in the path of the handle C for the latter to engage the plunger and open the switch when the handle C is arranged in a position for holding the door locked, and the switch is in circuit with a conductor 25 which together with the conductor 11 are connected to a so-called flasher element 26 for intermittently making and breaking the circuit to the bulb, as will be apparent. A push button type switch 27 is likewise provided for controlling the circuit and is connected to the switch 24 by a conductor 28, as well as to a source of current by a conductor 29, the source being grounded in the usual manner, as shown in Figure 2.

From the above description and disclosure in the drawing, it is believed that the operation of my device will be obvious, but it might be mentioned that when the handle C is in a position for holding the door latched or locked, the handle retains the switch 24 open and consequently the circuit is open, but when the handle C is moved from the passed dead center position of Figure 2, the switch 24 will automatically close for closing the circuit, thus it will be seen that the bulb can be energized before the door is opened, and before the semaphore arm is moved to its signalling position. However, the arm can be moved to its signalling position before or after the circuit is closed, as will be apparent.

The semaphore arms may have any suitable warning indicia thereon, such as the words "State law," as shown in Figure 3, and two lamp housings, each having a bulb therein, may be provided for each arm, with suitable flasher elements in the circuit to bring about alternate flashing of the bulbs.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. In a signal device for a vehicle, a substantially V-shaped bracket, means for securing the legs of said bracket to the outer wall of the vehicle with the apex thereof outermost, a semaphore arm hinged to one leg adjacent the apex for movement horizontally to a normal position parallel with said wall or to a signalling position at an outward angle thereto, spring means carried by the hinge for normally holding the arm parallel with the wall, illuminating means at the outer end of the arm, a sleeve secured to the other leg and extending through said wall, and a handle slidably mounted through the sleeve and having its outer end connected to the arm for both pivotal and sliding movement for moving the latter to its respective positions.

2. In a signal device for a vehicle, a substantially V-shaped bracket, means for securing the legs of said bracket to the outer side of a wall of the vehicle with the apex outermost, a semaphore arm hinged to one leg adjacent the apex for movement horizontally to a normal position parallel with said wall or to a signalling position at an outward angle thereto, illuminating means at the outer end of the arm, said arm having a chamber therein and extending longitudinally thereof and a slot opening along the length of the chamber and one side of the arm, a sleeve secured to the other leg and extending through said wall, a handle including a stem slidably mounted through the sleeve and extending through the slot, a knob on the inner end of the stem, and rollers connected to the stem and mounted for travel in the chamber for moving said arm to its respective positions upon slidable movement of said handle.

3. In a signal device for a vehicle, a substantially V-shaped bracket having one leg shorter than the other, means for securing both legs of the bracket to the outer side of a wall of the vehicle with the apex outermost and the short leg being arranged relative to the long leg for disposal of the short leg at right angles to said wall, a semaphore arm, a spring hinge connecting the arm to the short leg for movement of said arm horizontally to a normal position parallel with said wall or to a signalling position at right angles to said wall, the spring of said hinge acting to urge and hold said arm to and in its normal position, illuminating means at the outer end of said arm, a sleeve secured to said long leg and extending through said wall at an inclined angle thereto, and a handle slidably mounted through said sleeve and connected with said arm for moving the latter to its respective positions.

MURRAY L. MOORE.